United States Patent [19]

Jones

[11] Patent Number: 4,507,395

[45] Date of Patent: Mar. 26, 1985

[54] CHROMIA-MAGNESIA RAMMING CEMENT

[75] Inventor: Cecil M. Jones, Worcester, Mass.

[73] Assignee: Norton Company, Worcester, Mass.

[21] Appl. No.: 503,998

[22] Filed: Jun. 13, 1983

[51] Int. Cl.$^3$ .................... C04B 35/04; C04B 35/42
[52] U.S. Cl. .................... 501/115; 501/111; 106/85
[58] Field of Search .............. 106/85; 501/111, 115

[56] References Cited

U.S. PATENT DOCUMENTS

| | | | |
|---|---|---|---|
| 2,543,959 | 3/1951 | Eastin | 106/106 |
| 3,278,320 | 10/1966 | Neely et al. | 501/111 |
| 3,285,758 | 11/1966 | Limes et al. | 501/111 |
| 3,392,037 | 7/1968 | Neely et al. | 106/58 |
| 3,470,004 | 9/1969 | Begley et al. | 106/59 |
| 3,561,987 | 2/1971 | Jacobs et al. | 501/111 |
| 3,594,199 | 7/1971 | Treffner et al. | 106/59 |
| 3,615,777 | 10/1971 | Davies | 501/111 |
| 3,635,740 | 1/1972 | Davies et al. | 501/114 X |
| 3,753,746 | 8/1973 | Koerner | 501/111 X |
| 3,868,261 | 2/1975 | Cassens, Jr. et al. | 501/116 X |
| 4,235,636 | 11/1980 | Friedrick et al. | 501/111 |

*Primary Examiner*—G. L. Kaplan
*Assistant Examiner*—Nam X. Nguyen
*Attorney, Agent, or Firm*—Arthur A. Loiselle, Jr.

[57] ABSTRACT

A raw batch for a ramming cement is shown adapted to be fired in place to protect studded boiler tubes and the like. The fired cement includes a major proportion of a particulate chromia-magnesia spinel that is bonded in-situ with a clay phase including kaolinite and montmorillonite components and a reacted chromia and magnesia compound together with sodium hexametaphosphate.

11 Claims, No Drawings

CHROMIA-MAGNESIA RAMMING CEMENT

TECHNICAL FIELD

This invention relates to a refractory cement and more particularly to a ramming cement in the form of a chromia-magnesia spinel, clay, and a phosphate composition.

BACKGROUND ART AND PRIOR ART STATEMENT

U.S. Pat. Nos. 2,543,959, Eastin, Mar. 6, 1951, 3,278,320, Neely et al, Oct. 11, 1966, 3,392,037, Neely et al, July 9, 1968, 3,470,004, Begley et al, Sept. 30, 1969, 3,594,199, Treffner et al, July 20, 1971, 3,635,740, Davies et al, Jan. 18, 1972, 3,868,261, Cassens Jr. et al, Feb. 25, 1975.

The U.S. patents listed above are typical of the art known to the inventor at the time this application is filed.

U.S. Pat. No. 2,543,959 shows a magnesia containing cement made from sea water magnesia that has much less density as compared with magnesia produced from ore. The cement includes MgO from seawater and $MgCl_2$ and fillers together with sodium triphosphate or $(NaPO_3)n$ for example and it is said the phosphate addition minimizes shrinkage as the cement mixed with water, cures. Fillers suggested for use in this cement are sand, ground "lime rock", asbestos and iron oxide.

U.S. Pat. No. 3,278,320 shows a furnace cement for patching the hot lining in steel making furnaces made up of a mixture of chromite ore, magnesia, a bonding agent, a plasticizer, and iron oxide. The chromite ore may contain from 5% to 20% magnesia along with from 1% to 20% silica, 8% to 25% alumina, 15% to 29% iron oxide and 0.1% to 3% calcium oxide. A plastic clay such as bentonite may be used in an amount of from 1% to 3%. The batch includes an iron oxide addition of 100 mesh and finer with 90% passing a 325 mesh screen. A sodium tripolyphosphate bond is employed.

The chrome ore, that may contain a substantial magnesia component, is mixed with periclase that contains upwards of 95% magnesia. Sodium tripolyphosphate, in a small percent, together with bentonite and iron oxide are mixed with the chrome ore and periclase to form a dry mix that is wetted to be gunned onto the hot furnace lining.

In this cement the chrome ore and periclase form the bulk of the refractory composition and the ore and magnesia are reacted together in the thin ⅛" to ¼" liner applied to the hot surface of the steel furnace to form a monolithic coating.

U.S. Pat. No. 3,392,037 shows a composition used for molding refractory shapes that are said to have superior hot strength. The refractory grain from which the product is made may be periclase, chromite, or mixtures thereof mixed with sodium tripolyphosphate that serves as a binder. The mixture is wetted and pressed to shape and fired to form a brick that shows improved hot strength as a shaped fired brick, but this product is not suggested as a raw batch for a ramming cement.

U.S. Pat. No. 3,470,004 shows a refractory cement for bonding refractory elements made of chromia-magnesia components. For this purpose a mixture of chromia-magnesia spinel together with a plasticizing agent is made up, that includes a sodium silicate, a plasticizing kaolin addition and a wetting agent. The dry ingredients when mixed with water may be troweled into place and it is said that the water carries silicate particles and fused chromia-magnesia into the pores of the surface of the articles to be bonded to improve the bond strength.

U.S. Pat. No. 3,594,199 describes a prereacted chrome ore and magnesia such as periclase that is crushed and mixed with a pigment grade chromic oxide ($Cr_2O_3$) in an amount of 2 to 10% based on the weight of the grain. An aqueous binder such as sodium lignin sulfonate is added and the resulting mixture pressed to a desired shape and fired at 2800° to 3800° F. The mix is not suggested for use as a cement.

U.S. Pat. No. 3,635,740 shows another fired refractory shape. It is stated that a dual temperature firing procedure is to be followed to improve the hot strength of a chromia-magnesia brick. The chrome ore and magnesite are crushed and mixed together with a ball clay. A suitable liquid is added and the wet mix is pressed into a brick shape. The green brick is first fired at about 2900° F. and cooled and then fired at 3150° F. It is stated that the silica in the ball clay is distributed during the first firing by reaction with other compounds in the mix so that upon subsequent firing to the higher temperature the silicates do not liquify as has happened in the past. These formulations are made into bricks and no cement mixes are discussed, the invention being concerned with the two stage firing procedure to tie up the silicates.

U.S. Pat. No. 3,868,261 shows a chromia-magnesia spinel mortar that includes an addition of chromia to the mix to control shrinkage when the mortar is heated. No clay or other silicate containing compound is used in this mortar in order to eliminate all lower melting silica containing ingredients. The mix of this disclosure includes prereacted crushed chromia-magnesia 35 mesh and finer and as much as 50% passing 325 mesh to produce volume stability, i.e. to control shrinkage on the subsequent firing of the mortar. An addition of a pure, synthetic $Cr_2O_3$ in a finely divided state having an average particle size of 1.5 microns or less is made in an amount of up to 13% to further control shrinkage and it is said that because of the critical degree of fineness of the spinel and amount of pure $Cr_2O_3$ present, that volume stability results and shrinkage is controlled. There is no discussion of its troweling or ramming characteristics and the only use for this mortar is shown to be for bonding bricks together.

DISCLOSURE OF THE INVENTION

The primary advantage inherent in the use of the composition of this refractory cement product resides in its slag resistance. This advantage is enhanced by the characteristics of this product that make for its ease of installation and spinel bond formation in situ.

The cement is made up of a mixture of fused crushed chromia-magnesia spinel grain together with clay for plasticity and bonding, finely ground chromia, finely ground calcined magnesia and a phosphate bond. The ground and sized granular products are mixed intimately in a known manner and are prepared for ramming in place, for example, around studded boiler tubes to protect the tubes from the harmful effects of slag particles and corrosive gasses present in the hot atmosphere in the firing chambers of the boiler.

The rammed and fired cement of this invention has a porosity in the range of 16 to 21%. The pores are in the form of irregular shaped channels in an equivalent diameter size range of 15 to 20 microns. The bonding of the chromia-magnesia spinel that results from firing the rammed cememt in situ produces a reacted recrystallized spinel which expands and seals the pores against the entrance of slag and gasses into the fired cement.

The raw batch mixture includes from 80 to 90% by weight of a fused crushed chromia-magnesia spinel, a kaolinite clay within from 2 to 6% by weight, a montmorillonite clay within a range of from 1 to 3% by weight, (while a mixture of kaolinite and montmorillonite clays are desirable either one could supply ramming mix) a finely ground chromia present in an amount of from 6 to 10% by weight, a finely ground calcined magnesia in an amount of from 1 to 3% by weight and sodium hexametaphosphate present in an amount of from 1 to 3% by weight. While sodium hexametaphosphate is preferred other air setting phosphates could be used. The fine chromia and fine magnesia are preferably present in a weight ratio of chromia:magnesia of about 3 to about 5 parts chromia to 1 magnesia.

The particulate and other materials to be mixed together are prepared in dry form for mixing in conventional mixing apparatus. The chromia-magnesia spinel is ground to produce particles falling within a particle size range of 10 mesh and finer on the U.S. Standard Sieve scale. The plastic kaolinite is selected from a source of Florida Plastic Kaolin and the montmorillonite is a purified bentonite. The chromia is a pigment grade product with a particle size of 1 micron and the magnesia is a calcined magnesia selected to react with the chromia in situ to form the desired spinel ($MgO$-$Cr_2O_3$) when the rammed product is fired in place. Sodium hexametaphosphate completes the raw batch mixture.

The crushed fused chromia-magnesia spinel is preferably a pure spinel but may be rich in chromia; the high purity form of fused chromia-magnesia spinel, avoids the undesirable amounts of $Al_2O_3$, $SiO_2$, and $Fe_2O_3$ normally associated with the use of chromite ore. The kaolinite and montmorillonite clay components are selected to supply necessary plasticity for ramming.

The final bond for the chromia-magnesia spinel is produced as the rammed cement is heated when the boiler is fired. The pigment grade chromia, calcined magnesia, and the clay components are dispersed throughout the mass to fill the pores and seal the product as the firing progresses. The sodium hexametaphosphate phosphate acts as a bond to hold the product in place as it is rammed and is being fired. In addition the phosphate enhances the ceramic bonding at high temperatures.

EXAMPLE OF THE PREFERRED EMBODIMENT

A raw batch of the refractory cement of this invention includes the following:

| | U.S. Standard Sieve Size* | Wt. % |
|---|---|---|
| Fused crushed chromia-magnesia spinel | 10/45 | 23 |
| | 45/80 | 23 |
| | 80 and finer | 35 |
| Plastic Kaolinite | | 4 |
| Purified Montmorillonite | | 2 |
| Pigment Grade Chromia | | 8 |
| Calcined Magnesia Finely ground | | 2 |
| Sodium hexametaphosphate | | 3 |

*The designations 10/45 and 45/80 mean that the material will pass through a No. 10 screen and collect on a No. 45 screen; and material will pass through a No. 45 screen and collect on a No. 80 screen. The term 80 and finer means that the material is made up of particles that are able to pass through a No. 80 screen; the resulting particle size ranges from 80 mesh to very fine material.

These ingredients were mixed in a dry blend. The clay components are colloidal minerals and are provided to sinter and form the principal bond and to assist in installation. The pigment grade chromia has an average particle size of 0.7 microns and is about 97% pure $Cr_2O_3$. The calcined magnesia is at least 98% pure and has an average particle size of about 30 microns. Sodium hexametaphosphate is technical grade that is dissolved by the water content and used to achieve the sticky plastic mass as well as being air curing.

The wet mixture is rammed around the boiler tubes to be protected. For this purpose it is wetted with water to a ramming consistency and forced into position. After the rammed product has been gently dried in place the temperature of the furnace is raised to 600° C. to further fire the cement in place. At this temperature the pigment grade chromia and calcined magnesia react and together with the clay components and phosphate combine to form a permanent bond of small pore size to hold the cement firmly in place, and to resist penetration of the corrosive slag.

The fired cement will be found to have a bulk density of 3.5 $Mg/m^3$, a modulus of elasticity of 90 GPa, a modulus of rupture at 100° C. of 11 MPa (1600 psi) and at 600° C. 8 MPa (1200 psi).

Test bars fired at 1550° C. were studied for porosity, thermal expansion and slag resistance properties with the following results:
Density $Mg/m^3$ 3.5
Vol % pores 19
Mean pore radius 9.6 microns The Coefficient of thermal expansion up to 1500° C. was $9 \times 10^{-6}/°C$.

Drip slag tests at 1580 cc using coal slag with the following composition:
$SiO_2$: 52.4
$Al_2O_3$: 22.5
$TiO_2$: 1.1
$Fe_2O_3$: 6.0
CaO: 10.6
MgO: 1.8
$K_2O$: 0.5
$Na_2O$: 1.9

The slag tests results showed that a slag path groove was formed that was 1/64" deep which compares favorably with the best of the chromia-magnesia spinel bricks which are superior to all other competitive material in this use.

What is claimed is:

1. A retractory ramming cement consisting essentially of grains of fused crushed chromia-magnesia spinel bonded with an in situ fired bond resulting from heating said grains together with an intimate mixture of clay, fine chromia, fine calcined magnesia and a phosphate binder, and wherein the ratio of fine chromia to fine calcined magnesia is about 3 to about 5 parts by weight of chromia to 1 part by weight of calcined magnesia.

2. The refractory product of claim 1 wherein said grains are present in an amount of from about 80% to about 90% by weight and have a particle size of about 10 mesh and finer, and said clay is a mixture of kaolinite and montmorillonite.

3. The refractory product of claim 2 wherein said intimate mixture before being fired is present in an amount by weight of from about 2% to about 6% kaolinite, from about 1% to about 3% purified montmorillonite, from about 6% to about 10% fine grained chromia, from about 1% to about 3% fine grained calcined magnesia, and from about 1% to about 3% sodium hexametaphosphate.

4. The refractory product of claim 3 wherein said grains are present in an amount of about 85%.

5. The refractory product of claim 4 wherein the fired product has a density of 3.5 $Mg/m_3$.

6. The refractory product of claim 4 wherein the fired product has a porosity in the range of from 16% to 21%.

7. The refractory product of claim 6 wherein the pores are in the form of irregular shaped channels having a diameter in a size range in an equivalent diameter of from 15 microns to 20 microns.

8. A raw batch refractory cement mix for ramming consisting essentially of grains of fused crushed chromia-magnesia spinel and a mixture adapted to form a bond upon being fired including kaolinite, montmorillonite, fine chromia, fine calcined magnesia and a phosphate binder, and wherein the ratio of fine chromia to fine calcined magnesia is from about 3 to about 5 on a weight basis.

9. A raw batch as in claim 8 wherein said grains are present in an amount by weight in a range of from about 80% to about 90% and said bond mixture is present in an amount by weight of from about 20% to about 10%.

10. A raw batch as in claim 8 wherein said grains are present in an amount of from 80% to 90% by weight, and said mixture adapted to form a bond is present in an amount by weight of from about 2% to about 6% kaolinite, from about 1% to about 3% purified montmorillonite, from about 6% to about 10% fine grained chromia, from about 1% to about 3% fine grained calcined magnesia, and from 1% to 3% sodium hexametaphosphate.

11. A raw batch as in claim 8 wherein said grains have a particle size distribution based on the weight percent of said grains of about 23% of 10/45 mesh, about 23% 45/80 mesh and about 35% finer than 80 mesh; and said kaolinite clay is present in a weight percent of about 4%, said purified montmorillonite is present in a weight percent of about 2%, said pigment grade chromia is present in a weight percent of about 8%, said calcined magnesia is present in a weight percent of about 2%, and said sodium hexametaphosphate is present in a weight percent of about 3%.

* * * * *